May 29, 1956     A. I. APPLETON     2,747,758
ELECTRICAL BOX AND MOUNTING THEREFOR
Filed May 31, 1952
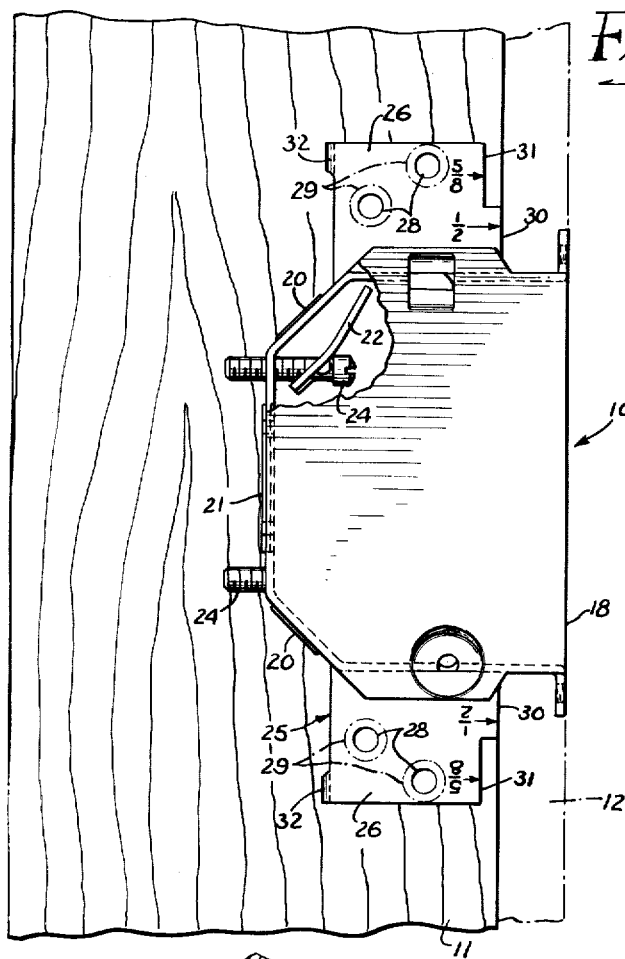
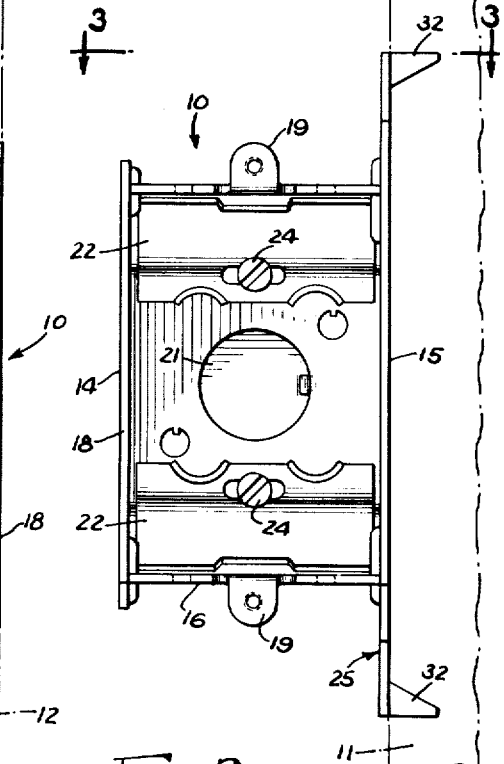
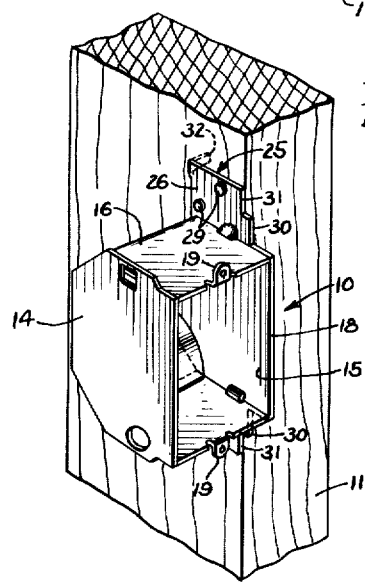
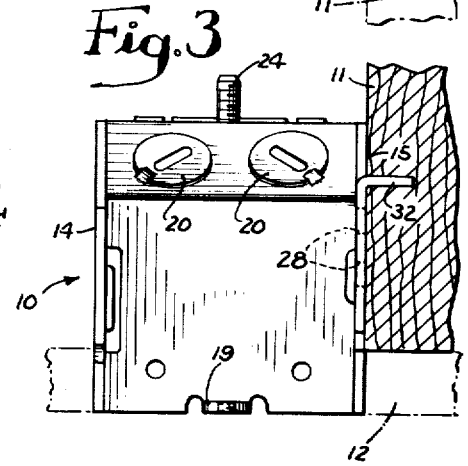
INVENTOR.
Arthur I. Appleton
BY
Carlson, Pitzner, Hubbard & Wolfe
Attys United States Patent Office 2,747,758
Patented May 29, 1956

2,747,758
ELECTRICAL BOX AND MOUNTING THEREFOR

Arthur I. Appleton, Northbrook, Ill.

Application May 31, 1952, Serial No. 290,903

1 Claim. (Cl. 220—3.92)

The present invention pertains in general to the field of fittings for the electrical power supply wiring of buildings and other structures. More specifically, the invention is concerned with a novel mounting for an outlet box or switch box of the type adapted for attachment to a stud or joist in recessed position relative to the associated wall or ceiling panel.

One object of the invention is to provide a box mounting of the type set forth and having means permitting quick and easy location of the box on the stud or other support in recessed and predetermined position relative to the wall or ceiling panel associated with the support, with due allowance for the thickness of such panel.

Another object is to provide a box of the character set forth and which can be mounted in place with proper allowance for the thickness of the wall or ceiling panel without demanding a high degree of skill on the part of the installer.

A further object is to provide a box and mounting of the foregoing type which will be extremely simple in construction and susceptible of economical manufacture on a mass productive basis.

Other objects and advantages will become apparent as the following description proceeds, taken together with the accompanying drawing, in which:

Figure 1 is a side elevation of an illustrative outlet box or switch box embodying the present invention, such box being mounted in place upon an upstanding wall stud.

Fig. 2 is an elevation showing the open end of the box of Fig. 1 with the supporting stud shown in dot-dash outline to permit more complete illustration of the box mounting.

Fig. 3 is a plan view of the box taken in the plane of the line 3—3 in Fig. 2.

Fig. 4 is a perspective view showing the box and stud as they appear in Fig. 1 but with the box positioned to allow for a wall panel of slightly greater thickness than that shown in Fig. 1.

While the invention is susceptible of various modifications and alternative constructions, a preferred embodiment has been shown in the drawing and will be described below in considerable detail. It should be understood, however, that there is no intention to limit the invention to the specific form disclosed, but on the contrary, the invention is to cover all modifications and alternative constructions falling within the spirit and scope of the invention as expressed in the appended claim.

Referring to the drawing more specifically, there is shown an illustrative outlet box or switch box 10 which in this instance happens to be mounted on a wall stud 11 in recessed position with respect to wall panel 12 associated with the stud 11. The box 10, which may conveniently be formed of heavy gauge sheet metal stampings, comprises a pair of side panels 14, 15 fixed to and separated by a spacer panel 16. In this case the panel 16 is of generally U-shaped form, and together with the side panels 14, 15, defines a box structure having an open end terminating in a free edge 18. The spacer panel 16 also has a pair of mounting ears 19 lying adjacent the edge 18 and adapted to serve as anchorage points for a receptacle or switch housed within the box. In addition, the spacer panel 16 is provided with a series of knockout plugs 20, 21 which, when removed, permit the introduction of one or more electrical conduits (not shown) leading power supply wiring into the box 10. When flexible conduit is used for this purpose, it may be anchored within the box as by means of inside clamp jaws 22 and their associated clamping screws 24.

The box 10 may be secured to the stud 11, or to any other appropriate support, by means of a mounting bracket 25. The latter may be rigidly fixed to either one of the side panels of the box 10 and in this instance is integral with the side panel 15. The bracket 25 terminates in end portions 26 extending beyond the maximum vertical dimension of the side panels proper, as viewed in Figs. 1, 2 and 4, each such end portion 26 having one or more fastener holes 28. The holes 28 are adapted to receive nails 29 or other appropriate fasteners, as indicated in Figs. 1 and 4.

Provision is made in the mounting of the box 10 permitting quick and easy location of the box on its associated supporting stud in recessed and predetermined position relative to the wall panel 12 associated with the stud 11, the free edge 18 of the box lying adjacent the finished inside surface of the wall panel 12. In furtherance of such objective, the edge of the bracket 25 adjacent the box edge 18 is fashioned with a series of graduated indexing shoulders 30, 31 spaced at predetermined distances from the plane of the box edge 18. In this case, each bracket end portion 26 has two shoulders designated by respective ones of the numerals 30, 31.

Upon reference to Fig. 1, it will be appreciated that by lining up corresponding pairs of the shoulders 30, 31 with the front face of the stud 11, which can be done entirely by sense of touch on the part of the installer, the box 10 can be speedily located on the stud 11 with its free edge 18 situated at predetermined and selected distances from the face of the stud 11, as determined by the location and spacing of the indexing shoulders 30, 31. In the embodiment illustrated in the drawing, the shoulders 30 happen to be spaced ½ inch back from the plane of the box edge 18 and are designated by appropriate indicia. This enables the box to be located with due allowance for a wall panel of ½ inch thickness, permitting the plane of the edge 18 to lie approximately flush with the inside surface of the wall panel. By the same token, the shoulders 31 happen to be spaced ⅝ of an inch from the plane of the box edge 18, thereby allowing for a wall panel ⅝ of an inch in thickness. Additional indexing shoulders may, of course, be formed on the bracket end portions 26 and the spacing of any or all of such shoulders may be varied to correspond with the wall or ceiling panel thicknesses most commonly encountered in building construction.

As an added convenience to the installer, and one permitting still further time to be saved on installation of the box 10, each end portion 26 of the bracket 25 may have fixed thereto a tapered prong 32 which can be driven into the stud 11 by a single hammer blow on the end portion 26. Accordingly, after the box has been duly located by means of the proper pair of the indexing shoulders 30, 31, the installer can temporarily secure it in place by simply driving the prongs 32 into the stud 11. The box will remain in the selected position unless actually withdrawn by hand, thus affording the installer an opportunity to pick up the nails 29 and drive them into the stud 11 so as to anchor the box 10 permanently thereon.

Upon reflection, it will be appreciated that there has been provided a novel box mounting which conforms to the objectives set forth earlier herein. The mounting described herein is applicable for use with numerous boxes of widely varying sorts and is susceptible of economical manufacture at costs comparable to those of conventional box mountings.

I claim as my invention:

In a box for housing electrical outlets, switches and the like, said box having an open end and being mountable on the side surface of a support with the open end adjacent the finished surface of a wall or ceiling panel to be installed in abutting position relative to the front face of the support, the combination comprising a pair of opposed side panels, a spacer panel fixed between said side panels and defining therewith the open end of the box, a counting bracket fixed to one of said side panels and extending beyond the dimension of the side panel proper, and a plurality of graduated indexing shoulders in the edge of said bracket adjacent the open end of said box, said graduated indexing shoulders being spaced respectively at predetermined distances from the plane of the open end of the box so as to correspond to different wall or ceiling panel thickness, said indexing shoulders being adapted when selectively alined with the front face of the support to position said box with its open end in predetermined and selected position relative to the finished surface of the wall or ceiling panel, such selective alinement of the indexing shoulders with the face of the support being conveniently accomplished by sense of touch on the part of the installer.

References Cited in the file of this patent

UNITED STATES PATENTS

| 1,558,678 | Koenig | Oct. 27, 1925 |
| 1,624,150 | Scherer | Apr. 12, 1927 |
| 1,850,616 | Barnett | Mar. 22, 1932 |
| 2,214,968 | MacMillen | Sept. 17, 1940 |
| 2,556,061 | Buckels | June 5, 1951 |

UNITED STATES PATENT OFFICE
CERTIFICATE OF CORRECTION

Patent No. 2,747,758

May 29, 1956

Arthur I. Appleton

It is hereby certified that error appears in the printed specification of the above numbered patent requiring correction and that the said Letters Patent should read as corrected below.

Column 3, line 15, for "counting bracket" read -- mounting bracket --.

Signed and sealed this 3rd day of December 1957.

(SEAL)
Attest:
KARL H. AXLINE
Attesting Officer

ROBERT C. WATSON
Commissioner of Patents